United States Patent
Nishio et al.

(10) Patent No.: US 8,835,755 B2
(45) Date of Patent: Sep. 16, 2014

(54) DYE-SENSITIZED SOLAR CELL, AND ELECTRODE AND LAMINATED FILM FOR THE SAME

(75) Inventors: Rei Nishio, Anpachi-gun (JP); Koji Kubo, Anapachi-gun (JP); Shinya Komura, Iwakuni (JP); Takanori Miyoshi, Iwakuni (JP)

(73) Assignees: Teijin Dupont Films Japan Limited, Tokyo (JP); Teijin Limited, Osaka (JP)

( * ) Notice: Subject to any disclaimer, the term of this patent is extended or adjusted under 35 U.S.C. 154(b) by 763 days.

(21) Appl. No.: 12/373,027

(22) PCT Filed: Jul. 13, 2006

(86) PCT No.: PCT/JP2006/314320
§ 371 (c)(1),
(2), (4) Date: Jan. 8, 2009

(87) PCT Pub. No.: WO2008/007448
PCT Pub. Date: Jan. 17, 2008

(65) Prior Publication Data
US 2010/0006150 A1    Jan. 14, 2010

(51) Int. Cl.
*H01L 31/00* (2006.01)
*H01G 9/20* (2006.01)
*H01M 14/00* (2006.01)

(52) U.S. Cl.
CPC ............. *H01G 9/2031* (2013.01); *Y02E 10/542* (2013.01); *H01G 9/2059* (2013.01); *H01M 14/005* (2013.01); *H01G 9/2095* (2013.01)
USPC ...................................................... 136/258

(58) Field of Classification Search
CPC . H01G 9/2031; H01G 9/2095; H01G 9/2059; H01M 14/005; Y02E 10/542
USPC .......................................................... 136/258
See application file for complete search history.

(56) References Cited

U.S. PATENT DOCUMENTS 4,668,840 A * 5/1987 Kiyama et al. ................. 136/244
6,291,763 B1 * 9/2001 Nakamura ..................... 136/256
(Continued)

FOREIGN PATENT DOCUMENTS

JP    2001-93590 A     4/2001
JP    2001-358348 A    12/2001
(Continued)

OTHER PUBLICATIONS

Gomez, M. et al., "Photoelectrochemical studies of dye-sensitized polycrystalline titanium oxide thin films prepared by sputtering", 1999, Thin Solid Films 342, pp. 148-152.*

(Continued)

*Primary Examiner* — Tamir Ayad
(74) *Attorney, Agent, or Firm* — Sughrue Mion, PLLC

(57) ABSTRACT

A laminated film comprising a porous semiconductor layer, a transparent conductive layer and a transparent plastic film, wherein
the porous semiconductor layer comprises crystalline titanium oxide fibers and crystalline titanium oxide fine particles, the crystalline titanium oxide fibers and the crystalline titanium oxide fine particles are substantially composed of an anatase phase and a rutile phase, the anatase phase content ratio calculated from the integral intensity ratio of X-ray diffraction is between 1.00 and 0.32, and the laminated film is used in an electrode for dye-sensitized solar cells,
and the electrode and a dye-sensitized solar cell comprising the same.

5 Claims, 1 Drawing Sheet

(56) References Cited

U.S. PATENT DOCUMENTS

| | | | |
|---|---|---|---|
| 2004/0194821 A1* | 10/2004 | Chittibabu et al. | 136/263 |
| 2005/0109385 A1 | 5/2005 | Kim et al. | |
| 2007/0079867 A1* | 4/2007 | Chittibabu et al. | 136/252 |
| 2007/0243718 A1 | 10/2007 | Shiratori et al. | |

FOREIGN PATENT DOCUMENTS

| | | |
|---|---|---|
| JP | 2002-50413 A | 2/2002 |
| JP | 2003-123860 A | 4/2003 |
| JP | 2003-168495 A | 6/2003 |
| JP | 2004-235240 A | 8/2004 |
| JP | 2006-019190 A | 1/2006 |
| JP | 2006-108080 A | 4/2006 |
| KR | 2007-9398 A | 1/2007 |
| WO | 2006/041092 A1 | 4/2006 |

OTHER PUBLICATIONS

Li, Dan et al., "Fabrication of Titania Nanofibers by Electrospinning", 2003, Nanoletters, vol. 3, No. 4, pp. 555-560.*

Mi Yeon Song et al.; Electrospun $TiO_2$ electrodes for dye-sensitized solar cells; Institute of Physics Publishing, Nanotechnology 15 (2004) 1861-1865.

Partial English language translation of JP-A-2006-19190 published Jan. 19, 2006, Title of Invention Photoelectric Cell; Inventor: Tsuguo Koyanagi, et al.

* cited by examiner

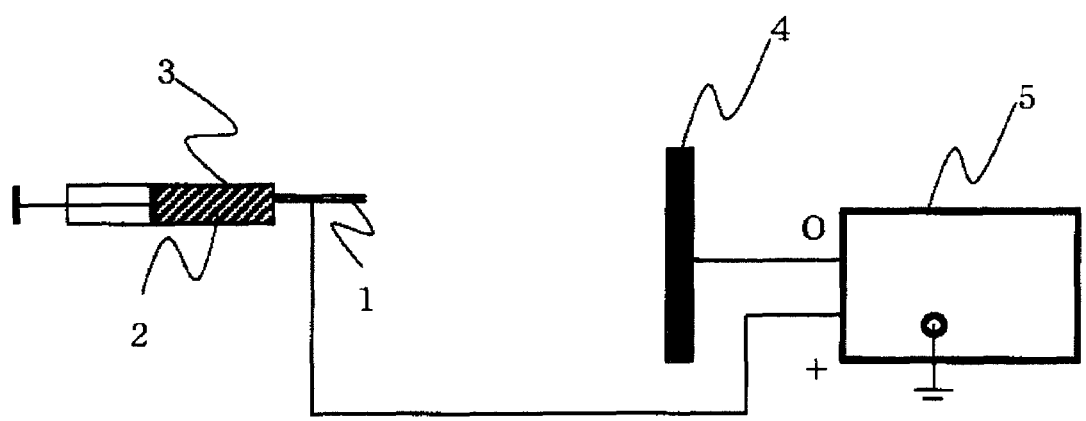

DYE-SENSITIZED SOLAR CELL, AND ELECTRODE AND LAMINATED FILM FOR THE SAME

TECHNICAL FIELD

The present invention relates to a dye-sensitized solar cell, and an electrode and a laminated film for the same. More specifically, it relates to an electrode for dye-sensitized solar cells which can be used to manufacture a dye-sensitized solar cell having high photovoltaic power generation performance in spite of the use of a plastic substrate, a laminated film for the same, and the dye-sensitized solar cell.

BACKGROUND ART

A dye-sensitized solar cell has been attracting attention as a new solar cell substituting a silicon-based solar cell since a photoelectric conversion element comprising dye-sensitized semiconductor fine particles was proposed (Nature, vol. 353, p. 737 to 740 (1991)).

A dye-sensitized solar cell comprising a plastic substrate attracts attention because it can be made soft and lightweight. In the case of a dye-sensitized solar cell comprising a glass substrate which is commonly used, a high-temperature heat treatment is carried out to form a porous structure so as to enhance integrity among oxide semiconductor particles and improve photoelectric conversion efficiency. However, the temperature is generally 400° C. or higher, and it is difficult to carry out a high-temperature heat treatment directly on the plastic substrate. To cope with this, in JP-A 11-288745, a dye-sensitized solar cell comprising a plastic substrate is manufactured by oxidizing metal foil and making the surface of the metal foil uneven. However, the specific surface area of the dye-sensitized solar cell is not sufficiently large, whereby photoelectric conversion efficiency is not fully improved. In JP-A 2001-160426, after the high-temperature heat treatment of a metal oxide is carried out on metal foil, the metal oxide layer is removed and fixed on the plastic substrate by a binder. However, this process is complicated and not suitable for mass-production. In JP-2002-50413, metal oxide particles are coated on a plastic substrate to form a semiconductor metal oxide layer. However, the metal oxide particles fixed on a transparent conductive layer fall off in a powdery form at the time of handling or peel off in an electrolyte.

JP-A 2001-93590 and JP-A 2001-358348 disclose that a metal oxide needle-like crystal is used as an electrode for solar cells to improve charge transport efficiency. However, to attain high charge transport efficiency by obtaining a good porous structure, the crystal state of the metal oxide must be properly controlled. For example, in the case of titanium oxide as the metal oxide, an anatase phase is preferred. However, it is difficult to manufacture needle-like titanium oxide having an anatase phase, and titanium oxide having a more stable rutile phase is first formed. As a result, photoelectric conversion efficiency is not satisfactory.

Meanwhile, electrospinning is one of the methods of manufacturing a metal oxide. In this method, an oxide precursor containing a burned-out component such as a polymer is ejected onto a substrate at a high aspect ratio and heated at a high temperature to obtain a metal oxide. An electrode for dye-sensitized solar cells having a metal oxide layer on a glass substrate by using this electrospinning has already been known. The above dye-sensitized solar cell is described in US2005/0109385 and "Nanotechnology" written by Mi Yeon Songs et al., p. 1861 to 1865, 2004.

In the above-described electrode for dye-sensitized solar cells, a metal oxide precursor is ejected onto a transparent conductive layer overlying a glass substrate at a high aspect ratio to be deposited and baked at a high temperature to obtain a metal oxide layer. The metal oxide tends to peel off from the transparent conductive layer due to the shrinkage of the metal oxide at the time of baking. Even when the metal oxide layer is formed by electrospinning, a sufficiently large specific surface area and sufficiently high charge transport efficiency cannot be obtained. Since the step of baking the metal oxide over the glass substrate is carried out at 400° C. or higher, it is difficult to apply this technology to an electrode for dye-sensitized solar cells which comprises a plastic substrate.

DISCLOSURE OF THE INVENTION

It is an object of the present invention to provide an electrode for dye-sensitized solar cells which can obtain high charge transport efficiency by adsorbing a sufficient amount of a dye in spite of the use of a plastic substrate, comprises a porous oxide film formed on a substrate with high adhesion without peeling off from the substrate, and can be used to manufacture a dye-sensitized solar cell having high photovoltaic power generation performance.

It is another object of the present invention to provide a laminated film comprising a plastic substrate for the above electrode.

It is still another object of the present invention to provide a dye-sensitized solar cell comprising the above electrode.

The other objects and advantages of the present invention will become apparent from the following description.

According to the present invention, firstly, the above objects and advantages of the present invention are attained by a laminated film which comprises a porous semiconductor layer, a transparent conductive layer and a transparent plastic film, wherein the porous semiconductor layer comprises crystalline titanium oxide fibers and crystalline titanium oxide fine particles, the crystalline titanium oxide fibers and the crystalline titanium oxide fine particles are substantially composed of an anatase phase and a rutile phase, the anatase phase content ratio calculated from the integral intensity ratio of X-ray diffraction is between 1.00 and 0.32, and the laminated film is used in an electrode for dye-sensitized solar cells.

According to the present invention, secondly, the above objects and advantages of the present invention are attained by an electrode for dye-sensitized solar cells which comprises the above laminated film and a dye adsorbed to the porous semiconductor layer of the laminated film.

According to the present invention, thirdly, the above objects and advantages of the present invention are attained by a dye-sensitized solar cell comprising the above electrode of the present invention.

BRIEF DESCRIPTION OF THE DRAWINGS

FIG. 1 is a diagram for explaining an ejection apparatus used in electrospinning employed in Examples.

EXPLANATIONS OF THE LETTERS OR NOTATIONS 1. solution spray nozzle
2. solution
3. solution storage tank 4. electrode
5. high-voltage generator

BEST MODE FOR CARRYING OUT THE INVENTION

In the laminated film of the present invention, a porous semiconductor layer comprises crystalline titanium oxide fibers and crystalline titanium oxide fine particles. Since the porous semiconductor layer comprises crystalline titanium oxide fibers and crystalline titanium oxide fine particles, both an excellent porous structure and a large specific surface area can be obtained. The crystalline titanium oxide fibers and the crystalline titanium oxide fine particles are substantially composed of an anatase phase and a rutile phase, and the area ratio in X-ray diffraction of the anatase phase to the total of the anatase phase and the rutile phase of the porous semiconductor layer comprising the crystalline titanium oxide fibers and the crystalline titanium oxide fine particles is between 1.00 and 0.32. The area ratio substantially does not exceed 1.0. When it is less than 0.32, it is difficult to attain high charge transport efficiency disadvantageously.

The anatase phase content ratio calculated from the integral intensity ratio of X-ray diffraction is obtained from the following equation by estimating integral intensity IA (anatase phase) and integral intensity IR (rutile phase) from diffraction peaks derived from the anatase phase and rutile phase titanium oxides which appear at 2θ=25.3° and 27.4°, respectively, in an X-ray profile obtained by carrying out intensity correction.

Anatase phase content ratio=$IA/(IA+IR)$

The expression "substantially composed of an anatase phase and a rutile phase" means that the ratio of the total of the anatase phase and the rutile phase to all the integral intensity in X-ray diffraction is preferably 80% or more, more preferably 83% or more, particularly preferably 88% or more. If the crystalline titanium oxide fibers and the crystalline titanium oxide fine particles are not substantially composed of the anatase phase and the rutile phase, charge transport efficiency will become unsatisfactory disadvantageously.

In the present invention, the average crystallite size measured by the X-ray diffraction of the anatase phase in the porous semiconductor layer is preferably 10 to 100 nm, more preferably 20 to 100 nm. When the average crystallite size is smaller than 10 nm, the number of interfaces between crystals increases, thereby reducing charge transport efficiency disadvantageously. When the size is larger than 100 nm, the specific surface area of the porous semiconductor layer decreases, whereby a sufficient amount of generated electricity is not obtained disadvantageously.

The measurement of the average crystallite size is carried out by X-ray diffraction. For the measurement of X-ray diffraction, a reflection method was employed by using the ROTA FLEX RU200B of Rigaku Denki Co., Ltd. and a goniometer having a radius of 185 nm, and CuKα ray monochromized with a monochrometer was used as the X-ray. A measurement sample obtained by adding X high-purity silicon powders for X-ray diffraction standards as an internal standard to the obtained porous semiconductor was used.

Intensity correction was made on the X-ray diffraction profile obtained above, and the diffraction angle 2θ was corrected with the 111 diffraction peak of the internal standard silicon. The half-value width of the 111 diffraction peak of silicon was 0.15° or less. The crystallite size was calculated from the following Scherrer's equation by using diffraction peaks which appeared at around 25.3° in the corrected X-ray diffraction profile. The diffraction peaks of titanium oxide and silicon at 2θ=24 to 30° were derived from Cu Kα1 and Cu Kα2 rays, not separate from each other and all handled as being derived from Cu Kα.

$$D = K \times \lambda / \beta \cos \theta$$

D: crystallite size (nm)
λ: measurement X-ray wavelength (nm)
β: expansion of diffraction line by crystallite size
θ: Bragg angle of diffraction peak (°)
K: form factor (Scherrer's constant).

Since β corrects the expansion of an optical system, (β=B−b) obtained by subtracting the half-value width "b" of the 111 diffraction peak of the internal standard silicon from the half-value width "B" of the diffraction peak of titanium oxide which appeared at around 25.3° was used, K=1 and λ=0.15418 nm.

In the present invention, the above porous semiconductor layer is preferably formed by applying a dispersion (coating) obtained by dispersing the crystalline titanium oxide fibers and the crystalline titanium oxide fine particles in a dispersion medium to the transparent conductive layer of a transparent plastic film having the transparent conductive layer, or by adding the crystalline titanium oxide fine particles to the crystalline titanium oxide fibers in a nonwoven state to form a layer.

As the dispersion medium of the dispersion (coating), for example, water or an organic solvent may be used, and an alcohol is preferably used as the organic solvent. For dispersion into the dispersion medium, a dispersion aid may be added in a small amount as required. Examples of the dispersion aid include surfactants, acids and chelating agents.

To improve adhesion between the crystalline titanium oxide fibers and the crystalline titanium oxide fine particles, a binder may be used.

<Crystalline Titanium Oxide Fibers>

The crystalline titanium oxide fibers are preferably manufactured by electrospinning.

In the electrospinning, the crystalline titanium oxide fibers can be obtained by ejecting a solution comprising a mixture of a titanium oxide precursor and a compound which forms a complex with the titanium oxide precursor, a solvent and a solute having high aspect formability onto a collection substrate to deposit it on the substrate and baking it.

Examples of the titanium oxide precursor include titanium tetramethoxide, titanium tetraethoxide, titanium tetranormalpropoxide, titanium tetraisopropoxide, titanium tetranormalbutoxide and titanium tetratertiarybutoxide. Titanium tetraisopropoxide and titanium tetranormalbutoxide are preferred because they are easily acquired.

Examples of the compound forming a complex with the titanium oxide precursor include coordination compounds such as carboxylic acids, amides, esters, ketones, phosphines, ethers, alcohols and thiols. Out of these, acetylacetone, acetic acid and tetrahydrofuran are preferably used. The amount of the compound forming a complex with the titanium oxide precursor is 0.5 equivalent or more, preferably 1 to 10 equivalents based on the titanium oxide precursor.

Examples of the solvent include aliphatic hydrocarbons such as hexane; aromatic hydrocarbons such as toluene and tetralin; alcohols such as n-butanol and ethylene glycol; ethers such as tetrahydrofuran and dioxane; dimethyl sulfoxide, N,N-dimethylformamide, n-methylaminopyridine and water. Out of these, N,N-dimethylformamide and water are preferred from the viewpoint of affinity for solutes. The solvents may be used alone or in combination. The amount of the solvent is preferably 0.5 to 30 times, more preferably 0.5 to 20 times based on the weight of the titanium oxide precursor.

An organic polymer is preferably used as the solute having high aspect ratio formability because it must be removed by baking from the viewpoint of handling. Examples of the solute include polyethylene oxide, polyvinyl alcohol, polyvinyl ester, polyvinyl ether, polyvinyl pyridine, polyacrylamide, ether cellulose, pectine, starch, polyvinyl chloride, polyacrylonitrile, polylactic acid, polyglycolic acid, polylactic acid-polyglycolic acid copolymer, polycaprolactone, polybutylene succinate, polyethylene succinate, polystyrene, polycarbonate, polyhexamethylene carbonate, polyallylate, polyvinyl isocyanate, polybutyl isocyanate, polymethyl methacrylate, polyethyl methacrylate, polynormalpropyl methacrylate, polynormalbutyl methacrylate, polymethyl acrylate, polyethyl acrylate, polybutyl acrylate, polyethylene terephthalate, polytrimethylene terephthalate, polyethylene naphthalate, polyparaphenylene terephthalamide, polyparaphenylene terephthalamide-3,4'-oxydiphenylene terephthalamide copolymer, polymetaphenylene isophthalamide, cellulose diacetate, cellulose triacetate, methyl cellulose, propyl cellulose, benzyl cellulose, fibroin, natural rubber, polyvinyl acetate, polyvinylmethyl ether, polyvinylethyl ether, polyvinylnormalpropyl ether, polyvinylisopropyl ether, polyvinylnormalbutyl ether, polyvinylisobutyl ether, polyvinyltertiarybutyl ether, polyvinylidene chloride, poly(N-vinylpyrrolidone), poly(N-vinylcarbazol), poly(4-vinylpyridine), polyvinylmethyl ketone, polymethylisopropenyl ketone, polypropylene oxide, polycyclopentene oxide, polystyrene sulfone, nylon 6, nylon 66, nylon 11, nylon 12, nylon 610, nylon 612 and copolymers thereof. Out of these, polyacrylonitrile, polyethylene oxide, polyvinyl alcohol, polyvinyl acetate, poly(N-vinylpyrrolidone), polylactic acid, polyvinyl chloride and cellulose triacetate are preferred from the viewpoint of solubility in the solvent.

When the molecular weight of the organic polymer is too low, the amount of the organic polymer becomes large and the amount of a gas generated by baking becomes large, whereby it is fairly possible that a defect is produced in the structure of the metal oxide. Therefore, the molecular weight of the organic polymer is suitably set. The molecular weight is preferably 100,000 to 8,000,000, more preferably 100,000 to 600,000 in the case of polyethylene glycol out of polyethylene oxides.

The amount of the solute having high aspect ratio formability is preferably as small as possible from the viewpoint of the improvement of the denseness of titanium oxide if the concentration at which a high aspect ratio is formed can be obtained, specifically 0.1 to 200 wt %, more preferably 1 to 150 wt % based on the weight of the titanium oxide precursor.

Electrospinning is a known technique for obtaining a titanium oxide ejected product by ejecting a solution of a matrix having high aspect ratio formability into an electrostatic field formed between electrodes, spinning the solution toward the electrodes and collecting the formed high aspect ratio formed product on a collection substrate. The titanium oxide ejected product maintains a high aspect ratio even when it is a laminate obtained after the solvent for dissolving the matrix having high aspect ratio formability is distilled off or even when the solvent is contained in the ejected product.

Although electrospinning is generally carried out at room temperature, when the volatilization of the solvent is insufficient, the temperature of the spinning atmosphere or the temperature of the collection substrate may be controlled as required.

Any metal, inorganic or organic electrodes may be used as the electrodes for electrospinning as long as they show conductivity, or electrodes having a metal, inorganic or organic thin film having conductivity on an insulating substance may also be used.

The electrostatic field is formed between a pair or a plurality of electrodes, and high voltage may be applied to all of the electrodes. This includes a case where three electrodes consisting of two high-voltage electrodes which differ in voltage value (for example, 15 kV and 10 kV) and an electrode connected to an earth are used and a case where more than 3 electrodes are used.

The high aspect ratio titanium oxide ejected product which is ejected by electrospinning is collected on an electrode which is a collection substrate. Then, this titanium oxide ejected product is baked. Although a general electric furnace may be used for baking, an electric furnace whose inside gas can be substituted as required may be used. The baking temperature at which crystals grow fully and crystal growth can be controlled is preferred. In order to control the growth of anatase phase crystals and rutile phase crystal transition, the baking temperature is preferably 300 to 900° C., more preferably 500 to 800° C. The crystalline titanium oxide fibers obtained as described above preferably have the following properties.

The fiber diameter is 50 to 1,000 nm, and the fiber length/fiber diameter ratio is 5 or more, preferably 5 to 300. When the fiber diameter is smaller than 50 nm, it is substantially difficult to handle the fibers disadvantageously. When the fiber diameter is larger than 1,000 nm, a dye cannot be adsorbed to the surface of each fiber fully and electricity is not fully generated disadvantageously.

The (anatase phase)/(anatase phase+rutile phase) ratio obtained from the area ratio of the crystal phases in X-ray diffraction is 1.00 to 0.50. When the ratio is lower than 0.50, charge transport efficiency lowers disadvantageously.

The size of the anatase phase crystallite in X-ray diffraction is 10 to 200 nm. When the size is smaller than 10 nm, charge transport efficiency lowers disadvantageously. When the size is larger than 200 nm, the specific surface area of the porous semiconductor layer decreases, thereby making it impossible to obtain a sufficient amount of generated electricity disadvantageously.

The BET specific surface area is 0.1 to 1,000 $m^2/g$. When the specific surface area is smaller than 0.1 $m^2/g$, the obtained fibers cannot adsorb a dye fully and electricity is not fully generated disadvantageously. When the specific surface area is larger than 1,000 $m^2/g$, it is substantially difficult to handle the fibers disadvantageously.

<Crystalline Titanium Oxide Fine Particles>

Meanwhile, the crystalline titanium oxide fine particles have a particle diameter of preferably 2 to 500 nm, more preferably 5 to 200 nm. When the particle diameter is smaller than 2 nm, the number of particle interfaces increases and charge transport efficiency lowers disadvantageously. When the particle diameter is larger than 500 nm, the amount of the adsorbed dye decreases and a sufficient amount of generated electricity is not obtained disadvantageously.

The crystal type of the titanium oxide fine particles may be anatase or rutile, and the titanium oxide fine particles may be used as a mixture of these crystal types.

<Formation of Porous Semiconductor Layer>

Preferably, the porous semiconductor layer contains 10 wt % or more of the crystalline titanium oxide fibers and 15 wt % or more of the crystalline titanium oxide fine particles. When the content of the crystalline titanium oxide fibers is lower than 10 wt %, sufficiently high porosity is not obtained disadvantageously and when the content of the crystalline titanium oxide fine particles is lower than 15 wt %, a sufficiently amount of generated electricity is not obtained disadvantageously. The contents of the crystalline titanium oxide fibers and the crystalline titanium oxide fine particles are more preferably 15 to 80 wt % and 20 to 85 wt %, respectively.

To form the porous semiconductor layer, there may be employed a method in which a coating solution comprising the crystalline titanium oxide fibers and the crystalline titanium oxide fine particles dispersed therein is applied or a method in which the crystalline titanium oxide fine particles are added to the crystalline titanium oxide fibers in a nonwoven state to form a layer.

The solid content of the dispersion used when the porous semiconductor layer is formed by applying a coating solution comprising the crystalline titanium oxide fibers and the crystalline titanium oxide fine particles dispersed therein is preferably 1 to 80 wt %. When the solid content of the dispersion is lower than 1 wt %, the final porous semiconductor layer becomes thin disadvantageously. When the solid content is higher than 80 wt %, the viscosity becomes too high, thereby making it difficult to apply the solution disadvantageously. The content is more preferably 4 to 60 wt %.

The coating solution which is a dispersion can be prepared by dispersing the crystalline titanium oxide fibers and the crystalline titanium oxide fine particles in a dispersion medium. In the dispersion medium, they may be dispersed by physical dispersion using a ball mill, medium agitation mill or homogenizer, or an ultrasonic treatment. The dispersion medium for the dispersion is, for example, water or an organic solvent, and an alcohol is preferably used as the organic solvent.

A binder for the titanium oxide fine particles may be added to this dispersion. A titanium oxide precursor may be preferably used as the binder. Example of the binder include titanium tetramethoxide, titanium tetraethoxide, titanium tetranormalpropoxide, titanium tetraisopropoxide, titanium tetranormalbutoxide, titanium tetratertiarybutoxide and hydrolysates of these titanium oxide precursors. They may be used alone or in combination.

To apply the coating solution to a transparent conductive layer formed on a transparent plastic film, any means which is commonly used for application may be employed. For example, roller coating, dip coating, air knife coating, blade coating, wire bar coating, slide hopper coating, extrusion coating or curtain coating may be used. Spin coating or spray coating with a general-purpose machine may also be used. Three big printing techniques which are relief printing, offset printing and gravure printing and wet printing techniques such as intaglio printing, rubber printing and screen printing may be used. Out of these, a preferred film forming method may be selected according to the viscosity and wet thickness of the solution. The coating weight of the coating solution is preferably 0.5 to 20 g, more preferably 5 to 10 g per 1 $m^2$ of the substrate at the time of drying.

After the coating solution is applied to the transparent conductive layer, it is heated to form a porous semiconductor layer. This heat treatment may be carried out in the drying step or another step after the drying step. The heat treatment is preferably carried out at 100 to 250° C. for 1 to 120 minutes, more preferably at 150 to 230° C. for 1 to 90 minutes, particularly preferably 180 to 220° C. for 1 to 60 minutes. This heat treatment makes it possible to suppress a rise in the resistance of the porous semiconductor layer while the thermal deformation of the film supporting the transparent conductive layer is prevented. The final thickness of the porous semiconductor layer is preferably 1 to 30 μm, more preferably 2 to 10 μm, particularly preferably 2 to 6 μm to enhance transparency.

A treatment for reinforcing physical bonding between particles, such as the application of ultraviolet light that the titanium oxide fine particles constituting the porous semiconductor layer strongly absorb or the application of microwaves to heat the fine particle layer may be carried out.

The method in which the crystalline titanium oxide fine particles are added to the crystalline titanium oxide fibers in a nonwoven state formed on the transparent conductive layer overlying the transparent plastic film to form a layer can be carried out by using pressure bonding or thermal pressure bonding by means of a press or a roll, bonding by means of a binder or a combination thereof.

In the case of the thermal pressure bonding, preferably, the surfaces of the crystalline titanium oxide fibers in a nonwoven state or the surface of the transparent conductive layer is activated to improve adhesion. As means of activation, the surfaces of the crystalline titanium oxide fibers in a nonwoven state are activated with an acid or alkaline solution, the surface of a thin film is activated by applying ultraviolet radiation or electron beams, or the surface is activated by carrying out a corona treatment or plasma treatment. Preferably, the surface is activated with an acid or alkaline solution or by carrying out a plasma treatment.

When a binder is used, a binder which does not prevent charge migration, such as a metal oxide or a precursor thereof, a conductive polymer, a conductive inorganic material, an organic adhesive, preferably a metal oxide or a precursor thereof may be used. As for bonding by means of a binder, a binder or a dispersion of a binder is applied to the transparent conductive layer or the crystalline titanium oxide fibers in a nonwoven state for bonding, or the crystalline titanium oxide fibers in a nonwoven state are placed on the transparent conductive layer and then a binder or a dispersion of a binder is added.

The crystalline titanium oxide fine particles are added to the crystalline titanium oxide fibers in a nonwoven state to form the porous semiconductor layer. To add the crystalline titanium oxide fine particles, a method in which the crystalline titanium oxide fibers in a nonwoven state are impregnated with a dispersion containing the crystalline titanium oxide fine particles and then heated, a method in which a dispersion containing the crystalline titanium oxide fine particles is applied to the transparent conductive layer, the crystalline titanium oxide fibers in a nonwoven state, or both of the crystalline titanium oxide fibers in a nonwoven state and the transparent conductive layer with a spray or a bar coater, a method in which the crystalline titanium oxide fibers in a nonwoven state and the crystalline titanium oxide fine particles are thermally pressure bonded together, a method in which the crystalline titanium oxide fibers in a nonwoven state and the crystalline titanium oxide fine particles are treated, for example, in an autoclave to be bonded together, a method in which fine particles are hydrothermally synthesized in the presence of the crystalline titanium oxide fibers in a nonwoven state and a metal oxide precursor, a method in which fine particles are formed by electron beams or UV treatment in the presence of the crystalline titanium oxide fibers in a nonwoven state and a metal oxide precursor, or a method in which the crystalline titanium oxide fine particles are bonded to the crystalline titanium oxide fibers in a nonwoven state by sputtering may be employed. These methods may be used in combination.

Out of these, the method in which the crystalline titanium oxide fibers in a nonwoven state are impregnated with a dispersion containing the crystalline titanium oxide fine particles and then heated and the method in which a dispersion containing the crystalline titanium oxide fine particles is applied to the transparent conductive layer, the crystalline titanium oxide fibers in a nonwoven state, or both of the crystalline titanium oxide fibers in a nonwoven state and the transparent conductive layer with a spray or a bar coater, are preferred. When these methods are employed, the crystalline titanium oxide fine particles can be charged into the inside easily advantageously. To improve adhesion between the crystalline titanium oxide fine particles and the crystalline titanium oxide fibers in a nonwoven state, the above-described surface activation may be employed or a binder may be used.

The impregnation or application of the crystalline titanium oxide fine particles to the crystalline titanium oxide fibers in a nonwoven state may be carried out before, after or at the same time when the crystalline titanium oxide fibers in a nonwoven state are placed on the transparent conductive layer. When the dispersion is used, bonding to the transparent conductive layer and the addition of the fine particles can be carried out simultaneously by adding the binder to the dispersion.

For example, a titanium oxide precursor can be preferably used as the above binder. Examples of the titanium oxide precursor include titanium tetramethoxide, titanium tetraethoxide, titanium tetranormalpropoxide, titanium tetratertiarybutoxide and hydrolysates of these titanium oxide precursors. They may be used alone or in combination.

When the crystalline titanium oxide fine particles are added in the form of a dispersion, the amount of the crystalline titanium oxide fine particles used in the dispersion is preferably 0.05 to 90 wt %, more preferably 1 to 70 wt %, particularly preferably 1 to 50 wt %. When the amount of the crystalline titanium oxide fine particles is smaller than 0.05 wt %, the final porous semiconductor layer becomes thin disadvantageously. When the amount is larger than 90 wt %, the viscosity becomes too high, thereby making it difficult to apply the dispersion disadvantageously.

As the dispersion medium of the dispersion is used water or an organic solvent, and an alcohol is preferably used as the organic solvent. To disperse the crystalline titanium oxide fine particles into the dispersion medium, a dispersion aid may be added in a small amount as required. Examples of the dispersion aid include surfactants, acids and chelating agents.

To improve charge transport efficiency in the porous semiconductor layer, it is preferred that the crystalline titanium oxide fine particles should be added to the crystalline titanium oxide fibers in a nonwoven state formed on the transparent conductive layer overlying the transparent plastic film to form a layer and then heated. This heat treatment may be carried out in the drying step or another step after the drying step. The heat treatment is preferably carried out at 100 to 250° C. for 1 to 120 minutes, more preferably at 150 to 230° C. for 1 to 90 minutes, particularly preferably at 180 to 220° C. for 1 to 60 minutes. This heat treatment makes it possible to suppress a rise in the resistance of the porous semiconductor layer while the thermal deformation of the plastic substrate is prevented.

A treatment for reinforcing physical bonding between metal oxides by applying ultraviolet light that the metal oxides strongly absorb or microwaves to the porous semiconductor layer to which the metal oxide fine particles have been added to heat the metal oxides may be carried out.

To prevent an electric short-circuit between the transparent conductive layer carrying the porous semiconductor and a counter electrode, in all the methods of forming the porous semiconductor layer, a primer layer may be formed on the transparent conductive layer. The primer layer is preferably made of $TiO_2$, $SnO_2$, $ZnO$ or $Nb_2O_5$, particularly preferably $TiO_2$. This primer layer may be formed by spray-pyrolysis described in Electrochim. Acta 40, 643-652 (1995) or sputtering. The thickness of this primer layer is preferably 5 to 1,000 nm, more preferably 10 to 500 nm.

<Transparent Plastic Film>

In the present invention, a plastic film is used as a substrate for supporting the transparent conductive layer. The plastic film is preferably a polyester film, and the polyester constituting this polyester film is a linear saturated polyester which is synthesized from an aromatic dibasic acid or an ester forming derivative thereof and a diol or an ester forming derivative thereof.

Examples of the polyester include polyethylene terephthalate, polyethylene isophthalate, polybutylene terephthalate, poly(1,4-cyclohexylene dimethylene terephthalate) and polyethylene-2,6-naphthalate. It may be a copolymer of these or a blend of one of these and a small amount of another resin. Out of these polyesters, polyethylene terephthalate and polyethylene-2,6-naphthalate are preferred because they have good balance among mechanical properties and optical properties.

Particularly polyethylene-2,6-naphthalate is most preferred because it is superior to polyethylene terephthalate in mechanical strength, heat shrinkage factor and the amount of an oligomer produced at the time of heating.

The polyethylene terephthalate comprises an ethylene terephthalate unit in an amount of preferably 90 mol % or more, more preferably 95 mol % or more, particularly preferably 97 mol % or more. The polyethylene-2,6-naphthalate comprises a polyethylene-2,6-naphthalate unit in an amount of preferably 90 mol % or more, more preferably 95 mol % or more, particularly preferably 97 mol % or more. The polyester may be a homopolymer or a copolymer comprising a third component, preferably a homopolymer.

The intrinsic viscosity of the polyester is preferably 0.40 dl/g or more, more preferably 0.40 to 0.90 dl/g. When the intrinsic viscosity is lower than 0.40 dl/g, a process break may occur frequently disadvantageously and when the intrinsic viscosity is higher than 0.90 dl/g, melt extrusion becomes difficult due to high melt viscosity with the result that the polymerization time becomes long uneconomically.

The polyester can be obtained by a conventionally known method. For example, a polyester having a low degree of polymerization can be obtained directly through a reaction between a dicarboxylic acid and a glycol. It may also be obtained by carrying out a polymerization reaction in the presence of a polymerization reaction catalyst after an ester interchange reaction between a lower alkyl ester of a dicarboxylic acid and a glycol. As the ester interchange reaction catalyst used is a conventionally known compound containing sodium, potassium, magnesium, calcium, zinc, strontium, titanium, zirconium, manganese or cobalt. Examples of the polymerization reaction catalyst include conventionally known catalysts such as antimony compounds including antimony trioxide and antimony pentoxide, germanium compounds typified by germanium dioxide, and titanium compounds including tetraethyl titanate, tetrapropyl titanate, tetraphenyl titanate and partial hydrolysates thereof, and titanylammonium oxalate, titanylpotassium oxalate and titanium trisacetyl acetonate. When polymerization is carried out through an ester interchange reaction, a phosphorus compound such as trimethyl phosphate, triethyl phosphate, tri-n-butyl phosphate or orthophosphoric acid is generally added to deactivate the ester interchange catalyst before the polymerization reaction. The content of elemental phosphorus in the polyester is preferably 20 to 100 ppm from the viewpoint of heat stability. The polyester may be processed into a chip after melt polymerization, and solid-phase polymerization may be further carried out under a heated reduced pressure or in a inert gas stream such as nitrogen stream.

The polyester film preferably contains substantially no particles. When it contains particles, its high transparency may be impaired or its surface may become rough to make it difficult to process the transparent conductive layer. The haze value of the film is preferably 1.5% or less, more preferably 1.0% or less, particularly preferably 0.5% or less.

The polyester film has a light transmittance at a wavelength of 370 nm of preferably 3% or less and at a wavelength of 400 nm of 70% or more. The light transmittance is a numerical value measured by using the MPC3100 spectrophotometer of Shimadzu Corporation. This light transmittance can be obtained by using a polyester containing a monomer which absorbs ultraviolet light, such as 2,6-naphthalenedicarboxylic acid, or by containing an ultraviolet absorber in the polyester.

Examples of the ultraviolet absorber include cyclic iminoester compounds such as 2,2'-p-phenylenebis(3,1-benzoxazin-4-one), 2,2'-p-phenylenebis(6-methyl-3,1-benzoxazin-4-one), 2,2'-p-phenylenebis(6-chloro-3,1-benzoxazin-4-one), 2,2'-(4,4'-diphenylene)bis(3,1-benzoxazin-4-one) and 2,2'-(2,6-naphthylene)bis(3,1-benzoxazin-4-one).

The polyester film has a 3D center line average roughness on both sides of preferably 0.0001 to 0.02 μm, more preferably 0.0001 to 0.015 μm, particularly preferably 0.0001 to 0.010 μm. Particularly when the 3D center line average roughness of at least one side is 0.0001 to 0.005 μm, the transparent conducive layer can be easily processed advantageously. The most preferred surface roughness of at least one side is 0.0005 to 0.004 μm.

The thickness of the polyester film is preferably 10 to 500 μm, more preferably 20 to 400 μm, particularly preferably 50 to 300 μm.

A description is subsequently given of the preferred method of manufacturing the polyester film. The glass transition temperature is abbreviated as Tg. The polyester film can be obtained by melt extruding a polyester into a film form, cooling it on a casting drum to solidify it so as to obtain an unstretched film, stretching this unstretched film at a total draw ratio of 3 to 6 times in a longitudinal direction once or twice or more at Tg to (Tg+60)° C. and then at a draw ratio of 3 to 5 times in a transverse direction at Tg to (Tg+60)° C., and optionally heat setting the stretched film at Tm180 to 255° C. for 1 to 60 seconds. To reduce the difference in heat shrinkage factor between the longitudinal direction and the transverse direction of the polyester film and heat shrinkage in the longitudinal direction, a method in which the film is shrunk in the longitudinal direction by a heat treatment as shown in JP-A 57-57628 or a method in which the film is relaxed and heated in a suspended state as shown in JP-A 1-275031 may be employed.

<Transparent Conductive Layer>

As the transparent conductive layer may be used a thin film of a conductive metal oxide (fluorine doped tin oxide, indium-tin composite oxide (ITO) or indium-zinc composite oxide (IZO)), a thin film of a metal such as platinum, gold, silver, copper or aluminum, or a carbon material film. This transparent conductive layer may be a laminate consisting of two or more layers or a composite film. Out of these, ITO and IZO thin films are particularly preferred because they have a high light transmittance and low resistance.

The surface resistance of the transparent conductive layer is preferably 100Ω/□ or less, more preferably 40Ω/□ or less. When the surface resistance is higher than 100Ω/□, the inside resistance of the cell becomes too high, whereby photovoltaic power generation efficiency lowers disadvantageously.

The thickness of the transparent conductive layer is preferably 100 to 500 nm. When the thickness is smaller than 100 nm, the surface resistance value cannot be reduced to the full and when the thickness is larger than 500 nm, light transmittance lowers and the transparent conductive layer is apt to be broken disadvantageously.

The surface tension of the transparent conductive layer is preferably 40 mN/m or more, more preferably 65 mN/m or more. When the surface tension is lower than 40 mN/m, adhesion between the transparent conductive layer and the porous semiconductor may deteriorate and when the surface tension is 65 mN/m or more, the formation of the porous semiconductor layer by the application of an aqueous coating solution containing water as the main component of a solvent becomes easy advantageously.

The transparent conductive layer having the above properties can be obtained by forming a transparent conductive layer from ITO or IZO and then carrying out processing by any one of the following methods.

(1) A method of activating the surface of the transparent conductive layer with an acid or alkaline solution (2) A method of activating the surface of the transparent conductive layer by applying ultraviolet radiation or electron beams (3) A method of activating the surface of the transparent conductive layer by carrying out a corona treatment or a plasma treatment Out of these, the method of activating the surface by a plasma treatment is particularly preferred because high surface tension is obtained.

<Adhesive Layer>

To improve adhesion between the polyester film and the transparent conductive layer, an adhesive layer may be formed between the polyester film and the transparent conductive layer. The thickness of the adhesive layer is preferably 10 to 200 nm, more preferably 20 to 150 nm. When the thickness of the adhesive layer is smaller than 10 nm, the effect of improving adhesion becomes unsatisfactory and when the thickness is larger than 200 nm, the cohesion failure of the adhesive layer is apt to occur and adhesion may deteriorate disadvantageously.

To form the adhesive layer, it is preferably formed by coating in the course of manufacturing the polyester film and more preferably formed on the polyester film before the completion of orientation crystallization. The "polyester film before the completion of orientation crystallization" includes an unstretched film, a monoaxially oriented film obtained by stretching an unstretched film in one of the longitudinal direction and the transverse direction, and an oriented film obtained by stretching an unstretched film in both the longitudinal direction and the transverse direction at a low draw ratio (biaxially oriented film before the completion of orientation crystallization by re-stretching in the longitudinal direction or the transverse direction in the end). Preferably, the unstretched film or the monoaxially oriented film out of these is preferably coated with an aqueous coating solution of the above composition, stretched in the longitudinal direction and/or the transverse direction and heat set.

The adhesive layer is preferably made of a material having excellent adhesion to both of the polyester film and the transparent conductive layer, as exemplified by polyester resin, acrylic resin, urethane acrylic resin, silicon acrylic resin, melamine resin and polysiloxane resin. These resins may be used alone or in combination of two or more.

<Hard Coat Layer>

To improve adhesion, especially the durability of adhesion between the polyester film and the transparent conductive layer, a hard coat layer may be formed between the adhesive layer and the transparent conductive layer. The thickness of the hard coat layer is preferably 0.01 to 20 μm, more preferably 1 to 10 μm.

To form a hard coat layer, it is preferably formed on the polyester film having an adhesive layer by coating. The hard coat layer is preferably made of a material having adhesion to both of the adhesive layer and the transparent conductive layer, as exemplified by a mixture of a resin component such as acrylic resin, urethane-based resin, silicon-based resin, UV curable resin or epoxy-based resin and inorganic particles. As the inorganic particles may be used alumina, silica or mica particles.

<Antireflection Layer>

In the present invention, an antireflection layer may be formed on the side opposite to the transparent conductive layer to increase light transmittance so as to improve photovoltaic power generation efficiency.

To form the antireflection layer, it is preferred that a single layer or two or more layers of a material having a refractive index different from the refractive index of the polyester film should be formed. In the case of a single-layer structure, a material having a smaller refractive index than that of the substrate film is preferably used whereas in the case of a multi-layer structure consisting of two or more layers, a layer adjacent to the laminated film is preferably made of a material having a larger refractive index than that of the polyester film and a layer formed on the above layer is preferably made of a material having a smaller refractive index than that of the above layer.

The material constituting this antireflection layer may be an organic or inorganic material if it satisfies the above refractive index relationship. It is preferably a dielectric material selected from the group consisting of $CaF_2$, $MgF_2$, $NaAlF_4$, $SiO_2$, $ThF_4$, $ZrO_2$, $Nd_2O_3$, $SnO_2$, $TiO_2$, Ce, $O_2$, ZnS and $In_2O_3$.

To form the antireflection layer, dry coating techniques such as vacuum deposition, sputtering, CVD and ion plating may be employed, or wet coating techniques such as gravure coating, reverse coating and die coating may be employed.

Prior to the formation of the antireflection layer, a pretreatment such as corona discharge treatment, plasma treatment, sputter etching treatment, electron beam application, ultraviolet application, primer treatment or adhesion treatment may be carried out.

<Formation of Dye-Sensitized Solar Cell and Electrode for the Same>

To manufacture a dye-sensitized solar cell by using the electrode of the present invention, a known method may be employed. More specifically, the following method may be employed.

(1) A dye is adsorbed to the porous semiconductor layer of the laminated film of the present invention. A dye having the property of absorbing visible range light and infrared range light, such as an organic metal complex dye typified by a ruthenium bipyridine-based complex (ruthenium complex), cyanine-based dye, coumarine-based dye, xanthene-based dye or porphyrin-based dye is dissolved in a solvent such as an alcohol or toluene to prepare a dye solution, and the porous semiconductor layer is immersed in the dye solution, or sprayed or coated with the dye solution to form one electrode A.

(2) As a counter electrode, an electrode B manufactured by forming a thin platinum layer on the transparent conductive layer side of the laminated film of the present invention by sputtering is used.

(3) The above electrodes A and B are joined together by inserting a thermal pressure bonding polyethylene film frame spacer (thickness of 20 μm) therebetween, and the spacer is heated at 120° C. to pressure bond them together. Further, the edge portions are sealed up with an epoxy resin adhesive.

(4) An electrolyte aqueous solution containing lithium iodide and iodine (molar ratio of 3:2) and 3 wt % of nylon beads having an average diameter of 20 μm as a spacer is injected into the inside of the joined product through small holes for injecting the electrolyte formed in a corner portion of the obtained sheet. The inside air is fully evacuated, and the small holes are closed with an epoxy resin adhesive in the end.

EXAMPLES

The following examples are provided to further illustrate the present invention. Evaluation items in the following examples and comparative examples were evaluated by the following methods.

(1) Particle Diameters of Crystalline Titanium Oxide Fine Particles and Fiber Diameters of Crystalline Titanium Oxide Fibers 20 sites were selected at random from a photo of the surface of the obtained metal oxide taken by a scanning electron microscope (S-2400 of Hitachi Ltd.)(2,000 magnifications) to measure the diameters of crystalline titanium oxide fine particles and the fiber diameters of crystalline titanium oxide fibers so as to obtain their average values as the average diameter and the average length of the fine particles.

(2) Fiber Diameter/Fiber Length Ratio of Crystalline Titanium Oxide Fibers

The average fiber length and the average fiber diameter were calculated by the same method as (1) that for measuring the particle diameters of the crystalline titanium oxide fine particles and the fiber diameters of the crystalline titanium oxide fibers so as to obtain their ratio.

(3) Method of Measuring BET Specific Surface Area

The specific surface area of the obtained metal oxide was measured by a BET method using a nitrogen gas.

(4) Measurement of X-Ray Diffraction

For the measurement of X-ray diffraction, a reflection method was employed by using the ROTA FLEX RU200B of Rigaku Denki Co., Ltd. and a goniometer having a radius of 185 nm, and CuKα ray monochromized with a monochrometer was used as the X-ray. A measurement sample obtained by adding high-purity silicon powders for X-ray diffraction standards as an internal standard to the obtained ceramic fibers was used.

(5) Measurement of Crystallite Size

Intensity correction was made on the X-ray diffraction profile obtained above, and the diffraction angle 2θ was corrected with the 111 diffraction peak of the internal standard silicon. The half-value width of the 111 diffraction peak of silicon was 0.15° or less. The crystallite size was calculated from the following Scherrer's equation by using diffraction peaks which appeared at around 25.3° in the corrected X-ray diffraction profile. The diffraction peaks of titanium oxide and silicon at 2θ=24 to 30° were derived from Cu Kα1 and C Kα2 rays, not separate from each other and all handled as being derived from Cu Kα.

$$D = K \times \lambda / \beta \cos \theta$$

D: crystallite size (nm)
λ: measurement X-ray wavelength (nm)
β: expansion of diffraction line by crystallite size
θ: Bragg angle of diffraction peak (°)
K: form factor (Scherrer's constant)

Since β corrects the expansion of an optical system, (β=B−b) obtained by subtracting the half-value width "b" of the 111 diffraction peak of the internal standard silicon from the half-value width "B" of the diffraction peak of titanium oxide which appeared at around 25.3° was used, K=1 and λ=0.15418 nm.

(6) Anatase Phase Content Ratio Calculated from Integral Intensity Ratio of X-Ray Diffraction The anatase phase content ratio calculated from the integral intensity ratio of X-ray diffraction was obtained from the following equation by estimating integral intensity IA (anatase phase) and integral intensity IR (rutile phase) from diffraction peaks derived from anatase phase and rutile phase titanium oxides which appeared at 2θ=25.3° and 27.4°, respectively, in the X-ray profile obtained by carrying out intensity correction.

$$\text{Anatase phase content ratio} = IA/(IA+IR)$$

(7) Intrinsic Viscosity

The intrinsic viscosity ([η]) dl/g) was measured by using an o-chlorophenol solution at 35° C.

(8) Film Thickness

The thickness of the film at 300 locations in total was measured at intervals of 10 cm in the film forming direction and the width direction by using a micrometer (K-402B of Anritsu Co., Ltd.). The average value of the obtained 300 film thickness data was calculated and taken as the film thickness.

(9) Light Transmittance

The light transmittance at wavelengths of 370 nm and 400 nm was measured by using the MPC3100 spectrophotometer of Shimadzu Corporation.

(10) Thickness of Coating Layer

A small piece of the film was embedded in an epoxy resin (Epomount of Refinetec Co., Ltd.), the resin was sliced to a thickness of 50 nm by using the Microtome2050 of Reichert-Jung Co., Ltd., and the thickness of the coating layer was measured by observing through a transmission electron microscope (LEM-2000 of Topcon Corporation) at an acceleration voltage of 100 KV and 100,000 magnifications.

(11) Surface Resistance Value

The surface resistance at 5 arbitrary points was measured by using a four-probe surface resistivity meter (Rolesta GP of Mitsubishi Chemical Co., Ltd.), and the average value of the measurement data was taken as a representative value.

(12) I-V Characteristics (Light Current-Voltage Characteristics)

A 100 mm$^2$ dye-sensitized solar cell was formed to calculate photovoltaic power generation efficiency by the following method. The solar simulator (PEC-L10) of Peccel Technologies Co., Ltd. was used to measure pseudo-sunlight having an incident light intensity of 100 mW/cm$^2$ in a 25° C. and 50% RH atmosphere. A DC voltage applied to the system was scanned at a constant speed of 10 mV/sec by using a current-voltage meter (PECK 2400) to measure an optical current output from the element so as to measure optical current-voltage characteristics and calculate photovoltaic power generation efficiency.

Example 1

Formation of Polyester Film

A pellet of polyethylene-2,6-naphthalene dicarboxylate containing substantially no particles and having an intrinsic viscosity of 0.63 was dried at 170° C. for 6 hours, supplied into the hopper of an extruder to be molten at a melting temperature of 305° C., filtered with a stainless steel thin wire filter having an average opening of 17 μm, extruded onto a rotary cooling drum having a surface temperature of 60° C. through a 3 mm slit die and quenched to obtain an unstretched film. The unstretched film obtained as described above was preheated at 120° C. and further heated with an IR heater set to 850° C. 15 mm from above to be stretched to 3.1 times in the longitudinal direction between low-speed and high-speed rolls. The following coating A was applied to one side of the film obtained after stretching in the longitudinal direction with a roll coater to ensure that the thickness of the coating film after drying was 0.25 μm so as to form an adhesive layer.

The film was then supplied to a tenter to be stretched to 3.3 times in the transverse direction at 140° C. The obtained biaxially oriented film was heat set at 245° C. for 5 seconds to obtain a polyester film having an intrinsic viscosity of 0.58 dl/g and a thickness of 125 μm. Thereafter, this film was thermally relaxed at a relaxation rate of 0.7% and a temperature of 205° C. while it was suspended.

<Preparation of Coating A>

66 parts of dimethyl 2,6-naphthalenedicarboxylate, 47 parts of dimethyl isophthalate, 8 parts of dimethyl 5-sodium sulfoisophthalate, 54 parts of ethylene glycol and 62 parts of diethylene glycol were fed to a reactor, and 0.05 part of tetrabutoxy titanium was added to the mixture and heated in a nitrogen atmosphere by controlling the temperature to 230° C. to carry out an ester interchange reaction while the formed methanol was distilled off. Then, the temperature of the reaction system was gradually raised to 255° C., and the inside pressure of the system was reduced to 1 mmHg to carry out a polycondensation reaction so as to obtain a polyester. 25 parts of this polyester was dissolved in 75 parts of tetrahydrofuran, 75 parts of water was added dropwise to the obtained solution under high-speed agitation at 10,000 rpm to obtain a milky white dispersion, this dispersion was distilled under a reduced pressure of 20 mmHg to remove tetrahydrofuran, and a water dispersion of the polyester having a solid content of 25 wt % was obtained.

Then, 3 parts of sodium laurylsulfonate as a surfactant and 181 parts of ion exchange water were fed to a four-necked flask and heated up to 60° C. in a nitrogen gas stream, 0.5 part of ammonium persulfate and 0.2 part of sodium hydrogen nitrite were added as polymerization initiators, and further a mixture of 30.1 parts of methyl methacrylate, 21.9 parts of 2-isopropenyl-2-oxazoline, 39.4 parts of polyethylene oxide (n=10) methacrylic acid and 8.6 parts of acrylamide all of which are monomers was added dropwise over 3 hours while the temperature of the solution was adjusted to 60 to 70° C. After the end of the addition, the reaction was continued under agitation while the above temperature was maintained for 2 hours, and then the reaction product was cooled to obtain an acrylic water dispersion having a solid content of 35 wt %.

Meanwhile, a water solution containing 0.2 wt % of a silica filler (average particle diameter: 100 nm) (Snowtex ZL of Nissan Chemical Industries, Ltd.) and 0.3 wt % of polyoxyethylene (n=7) lauryl ether (Naloacty N-70 of Sanyo Chemical Industries, Ltd.) as a wetting agent was prepared.

8 parts by weight of the above water dispersion of the polyester, 7 parts by weight of the acrylic water dispersion and 85 parts by weight of the water solution were mixed together to prepare a coating A.

<Hard Coat>

The obtained polyester film was used and a UV curable hard coating (Dezolite R7501 of JSR Corporation) was applied to the adhesive layer side of the polyester film to a thickness of about 5 μm and cured by UV to form a hard coat layer.

<Formation of Transparent Conductive Layer>

A transparent conductive layer made of IZO and having a thickness of 260 nm was formed on the hard coat layer formed side by DC magnetron sputtering using an IZO target comprising indium oxide as the main component and 10 wt % of zinc oxide. The formation of the transparent conductive layer by sputtering was carried out by evacuating the inside of a chamber to $5 \times 10^{-4}$ Pa before plasma discharge, introducing argon and oxygen into the chamber to increase the inside pressure to 0.3 Pa and applying electric power to the IZO target at a power density of 2 W/cm². The partial pressure of oxygen was 3.7 mPa. The surface resistance value of the transparent conductive layer was 15Ω/□.

Subsequently, a plasma treatment was made on the surface of the transparent conductive layer in a nitrogen gas stream (60 L/min) at a rate of 1 m/min by using a normal pressure plasma surface treatment device (AP-T03-L of Sekisui Chemical Co., Ltd.). At this point, the surface resistance value was 16Ω/□ and the surface tension was 71.5 mN/m.

<Antireflection Layer>

A $Y_2O_3$ layer having a thickness of 75 nm and a refractive index of 1.89, a $TiO_2$ layer having a thickness of 120 nm and a refractive index of 2.3 and a $SiO_2$ layer having a thickness of 90 nm and a refractive index of 1.46 were formed on the side opposite to the transparent conductive layer side of the laminated film by high-frequency sputtering in this order to form an antireflection layer. When these electrostatic thin films were formed, the degree of vacuum was $1 \times 10^{-3}$ Torr and 55 sccm of Ar and 5 sccm of $O_2$ were flown as gases. The substrate was kept at room temperature without heating or cooling in the course of forming the films.

<Formation of Crystalline Titanium Oxide Fibers by Electrospinning>

A solution containing 1 part by weight of polyacrylonitrile (manufactured by Wako Pure Chemical Industries, Ltd.) and 9 parts by weight of N,N-dimethylformamide (special grade, manufactured by Wako Pure Chemical Industries, Ltd.) was mixed with a solution containing 1 part by weight of titanium tetranormalbutoxide (first grade, manufactured by Wako Pure Chemical Industries, Ltd.) and 1 part by weight of acetylacetone (special grade, manufactured by Wako Pure Chemical Industries, Ltd.) to prepare a spinning solution. A fiber structure was fabricated from this spinning solution by using the apparatus shown in FIG. 1. The inner diameter of a spray nozzle 1 was 0.8 mm, the voltage was 15 kV, and the distance between the spray nozzle 1 and an electrode 4 was 15 cm. That is, the solution 2 contained in a solution storage tank 3 was ejected from the spray nozzle 1 toward the electrode 4. Meanwhile, a voltage of 15 kV was applied between the electrode 4 and the spray nozzle 1 by a high-voltage generator. The obtained fiber structure was heated up to 600° C. for 10 hours in an air atmosphere in an electric furnace and then kept at 600° C. for 2 hours to manufacture a titania fiber. When the obtained titanium oxide having a high aspect ratio was observed through an electron microscope, its fiber diameter was 280 nm, its fiber length/fiber diameter ratio was 50 or more, and the both ends of the fiber were not seen in the view field of a scanning electron microscope. The area ratio of the anatase phase to the total of the anatase phase and the rutile phase in X-ray diffraction was 0.94. The anatase crystallite size was 22 nm. According to the X-ray diffraction result of the obtained titania fiber, as a sharp peak was seen at 2θ=25.3°, it was confirmed that the anatase phase was formed. The BET specific surface area was 0.4 m²/g.

<Binder>

60 parts by weight of titanium tetraisopropoxide was added dropwise to 120 parts by weight of 0.1 M nitric acid, and heated and refluxed for 12 hours to be condensed so as to obtain a binder. The weight of the solid matter after drying was 17 wt %.

<Formation of Porous Semiconductor Layer>

44 wt % based on the total weight of all the titanium oxides of the above crystalline titanium oxide fibers, 44 wt % based on the total weight of all the titanium oxides of the SP-200 titanium oxide dispersion (content of titanium oxide: 25 wt % anatase phase and a small amount of rutile phase) of Showa Titanium Co., Ltd. as the crystalline titanium oxide fine particles and 12 wt % based on the total weight of all the titanium oxides of the above binder were dispersed into ethanol (manufactured by Wako Pure Chemical Industries, Ltd.) to prepare a dispersion having a solid content of 12 wt % and treat it by the application of 40.0 Hz ultrasonic waves for 30 minutes. As a result, a solution for the porous semiconductor layer was obtained. This solution was applied to the transparent conductive layer with a bar coater immediately and heated at 180° C. in the atmosphere for 5 minutes to form a 5 μm-thick porous semiconductor layer. The peel-off and brittleness of the porous semiconductor layer were not seen after the heat treatment, and an electrode for dye-sensitized solar cells having high adhesion to the substrate was manufactured.

When the X-ray diffraction of the porous semiconductor layer obtained as described above was carried out, a peak derived from the anatase phase and a weak peak derived from the rutile phase were seen, the anatase phase content ratio calculated from the integral intensity ratio of X-ray diffraction was 0.92, and the size of the anatase phase crystal was 24 nm.

<Fabrication of Dye-Sensitized Solar Cell>

This electrode was immersed in a 300 μM ethanol solution of a ruthenium complex (Ru535bisTBA of Solaronix Co., Ltd.) for 24 hours to adsorb the ruthenium complex to the surface of the optical function electrode. A Pt film was deposited on the transparent conductive layer of the above-described laminated film by sputtering to form a counter electrode. The electrode and the counter electrode were joined together with a thermal pressure bonding polyethylene film frame spacer (thickness of 20 μm) therebetween, and the spacer was heated at 120° C. to pressure bond these electrodes together. Further, the edge portions of these electrodes were sealed up with an epoxy resin adhesive. After an electrolyte solution (3-methoxypropionitrile solution containing 0.5 M lithium iodide, 0.05 M iodine and 0.5 M tert-butylpyridine) was injected into the inside of the obtained product, the product was sealed up with an epoxy-based adhesive.

When the I-V characteristics of the completed dye-sensitized solar cell were measured (effective area of 100 mm²), the open voltage, short-circuit current density and curve factor were 0.70 V, 8.25 mA/cm² and 0.47, respectively. As a result, photovoltaic power generation efficiency was 2.71%.

Example 2

The procedure of Example 1 was repeated except that the AMT-100 titanium oxide for optical catalysts of Teika Co., Ltd. (average particle diameter: 6 nm, anatase phase) was used as crystalline titanium oxide fine particles used to form the porous semiconductor layer. The characteristic properties of the titanium oxides are shown in Table 1. The characteristic properties of the obtained porous semiconductor layer and the evaluation results of the obtained cell are shown in Table 2.

Example 3

The procedure of Example 1 was repeated except that 0.5 part by weight of titanium tetranormalbutoxide (first grade, manufactured by Wako Pure Chemical Industries, Ltd.) was used to form crystalline titanium oxide fibers. The characteristic properties of the titanium oxides are shown in Table 1. the characteristic properties of the obtained porous semiconductor layer and the evaluation results of the obtained cell are shown in Table 2.

Example 4

The procedure of Example 1 was repeated except for the formation of the crystalline titanium oxide fibers and the formation of the porous semiconductor layer.

<Formation of Crystalline Titanium Oxide Fibers by Electrospinning>

1.3 parts by weight of acetic acid (special grade, manufactured by Wako Pure Chemical Industries, Ltd.) was added to 1 part by weight of titanium tetranormalbutoxide (first grade, manufactured by Wako Pure Chemical Industries, Ltd.) to obtain a homogeneous solution. A gel was formed in the solution by adding 1 part by weight of ion exchange water to this solution under agitation. The formed gel was dissociated by further continuing agitation so that a transparent solution could be prepared.

0.016 part by weight of polyethylene glycol (manufactured by Wako Pure Chemical Industries, Ltd., first grade, average molecular weight of 300,000 to 500,000) was mixed with the prepared solution to prepare a spinning solution. When spinning was carried out from this spinning solution by using the apparatus shown in FIG. 1, a planar fiber structure was obtained on the electrode 4. The inner diameter of the spray nozzle 1 was 0.4 mm, the voltage was 15 kV, and the distance between the spray nozzle 1 and the electrode 4 was 10 cm. A deposit of crystalline titanium oxide fibers in a nonwoven state was formed by heating the obtained fiber structure up to 600° C. in an air atmosphere in an electric furnace for 10 hours and keeping the fiber structure at 600° C. for 2 hours. The characteristic properties of the crystalline titanium oxide fibers obtained as described above are shown in Table 1.

<Formation of Porous Semiconductor Layer>

The above-described crystalline titanium oxide fibers in a nonwoven state (8.1 g/m$^2$), 43.5 wt % based on the total weight of all the titanium oxides of the SP-200 titanium oxide dispersion (content of titanium oxide: 25.1 wt % anatase phase and a small amount of rutile phase) of Showa Titanium Co., Ltd. as the crystalline titanium oxide fine particles and 13 wt % based on the total weight of all the titanium oxides of the above binder were applied to the transparent conductive layer and heated at 180° C. in the atmosphere for 5 minutes to form a 5 μm-thick porous semiconductor layer. The peel-off and brittleness of the porous semiconductor layer were not seen after the heat treatment, and an electrode for dye-sensitized solar cells having high adhesion to the substrate was manufactured. The characteristic properties of the crystalline titanium oxide fibers obtained as described above are shown in Table 2.

A dye-sensitized solar cell was manufactured in the same manner as in Example 1 by using the porous semiconductor obtained as described above. The evaluation result of cell performance is shown in Table 2.

Example 5

A porous semiconductor layer was formed in the same manner as in Example 1 except that crystalline titanium oxide fibers were manufactured in the same manner as in Example 4. The characteristic properties of the crystalline titanium oxides are shown in Table 1 and the characteristic properties of the porous semiconductor layer are shown in Table 2. A dye-sensitized solar cell was manufactured in the same manner as in Example 1 except that the porous semiconductor obtained as described above was used. The evaluation result of cell performance is shown in Table 2.

Comparative Example 1

A porous semiconductor layer was obtained in the same manner as in Example 1 except that crystalline titanium oxide fine particles were not added at the time of forming the porous semiconductor layer, and a dye-sensitized solar cell comprising the same was evaluated. A short-circuit current dropped due to the addition of no fine particles with the result of a reduction in photoelectric conversion efficiency.

Comparative Example 2

A porous semiconductor layer was obtained in the same manner as in Example 5 except that crystalline titanium oxide fine particles were not added at the time of forming the porous semiconductor layer, and a dye-sensitized solar cell comprising the same was evaluated. The results are shown in Table 2.

Comparative Example 3

Although a porous semiconductor layer was obtained in the same manner as in Example 1 except that crystalline titanium oxide fibers were not added at the time of forming the porous semiconductor layer, the partial peel-off of the porous semiconductor layer was seen. A dye-sensitized solar cell comprising the same was evaluated. The results are shown in Table 2.

TABLE 1

| | Crystalline titanium oxide fibers | | | | | | Crystalline titanium oxide fine particles | |
|---|---|---|---|---|---|---|---|---|
| | Fiber diameter (nm) | Fiber length/fiber diameter | Crystal phase area ratio | Anatase crystal size (nm) | BET specific surface area (m$^2$/g) | Amount (wt %) | Particle diameter (nm) | Amount (wt %) |
| Example 1 | 280 | 50< | 0.94 | 22 | 49.0 | 44 | 46 | 44 |
| Example 2 | 280 | 50< | 0.94 | 22 | 49.0 | 44 | 10 | 44 |

TABLE 1-continued

| | Crystalline titanium oxide fibers | | | | | | Crystalline titanium oxide fine particles | |
|---|---|---|---|---|---|---|---|---|
| | Fiber diameter (nm) | Fiber length/fiber diameter | Crystal phase area ratio | Anatase crystal size (nm) | BET specific surface area (m²/g) | Amount (wt %) | Particle diameter (nm) | Amount (wt %) |
| Example 3 | 172 | 50< | 0.98 | 16 | 65.2 | 44 | 46 | 44 |
| Example 4 | 284 | 50< | 1.00 | 160 | 0.3 | 44 | 46 | 44 |
| Example 5 | 284 | 50< | 1.00 | 160 | 0.3 | 44 | 46 | 44 |
| Comparative Example 1 | 280 | 50< | 0.94 | 22 | 49.0 | 87 | — | — |
| Comparative Example 2 | 284 | 50< | 1.00 | 160 | 0.3 | 87 | — | — |
| Comparative Example 3 | — | — | — | — | — | — | 46 | 87 |

TABLE 2

| | Porous semiconductor | | | Evaluation of cell | | | |
|---|---|---|---|---|---|---|---|
| | Crystal peak | Anatase phase content ratio | Anatase crystal size (nm) | Voc (V) | Jsc (mA/cm²) | FF | Eff (%) |
| Example 1 | anatase.rutile | 0.92 | 24 | 0.70 | 8.25 | 0.47 | 2.71 |
| Example 2 | anatase.rutile | 0.95 | 19 | 0.68 | 7.00 | 0.44 | 2.09 |
| Example 3 | anatase.rutile | 0.96 | 21 | 0.70 | 8.80 | 0.45 | 2.77 |
| Example 4 | anatase.rutile | 0.94 | 95 | 0.71 | 6.18 | 0.46 | 1.99 |
| Example 5 | anatase.rutile | 0.95 | 93 | 0.71 | 7.29 | 0.49 | 2.54 |
| Comparative Example 1 | anatase.rutile | 0.93 | 23 | 0.69 | 2.95 | 0.40 | 0.78 |
| Comparative Example 2 | anatase | 1.00 | 150 | 0.66 | 0.21 | 0.60 | 0.10 |
| Comparative Example 3 | anatase.rutile | 0.92 | 30 | 0.71 | 3.41 | 0.46 | 1.59 |

Voc: open voltage
Jsc: short-circuit current
FF: fill factor
Eff: efficiency

The invention claimed is:

1. A laminated film comprising a porous semiconductor layer, a transparent conductive layer and a transparent plastic film, wherein
the porous semiconductor layer comprises crystalline titanium oxide fibers having a fiber diameter of 50 to 1,000 nm and a fiber length/fiber diameter ratio of 5 or more and being in a non-woven state in an amount of 10 wt % or more and crystalline titanium oxide fine particles having a particle diameter of 2 to 46 nm in an amount of 15 wt % or more, the crystalline titanium oxide fibers and the crystalline titanium oxide fine particles are substantially composed of an anatase phase and a rutile phase, the anatase phase content ratio calculated from the integral intensity ratio of X-ray diffraction is between 1.00 and 0.32, and the laminated film is used in an electrode for dye-sensitized solar cells.

2. The laminated film according to claim 1, wherein an average crystallite size measured by the X-ray diffraction of the anatase phase of the porous semiconductor layer is 10 to 100 nm.

3. An electrode for dye-sensitized solar cells which comprises the laminated film of claim 1 and a dye adsorbed to the porous semiconductor layer of the laminated film.

4. A dye-sensitized solar cell comprising the electrode of claim 3.

5. The laminated film according to claim 1, wherein the transparent plastic film is of polyethylene-2,6-naphthalate.

* * * * *